(12) United States Patent
Morrison et al.

(10) Patent No.: US 8,572,204 B2
(45) Date of Patent: Oct. 29, 2013

(54) DATA PROCESSING SYSTEM USING GEOGRAPHICAL LOCATIONS

(75) Inventors: Craig Morrison, Wales (GB); Joel Cockrill, Conwy (GB); Johnathan Jones Morris, Gwynedd (GB); Robert Spaull, Conwy (GB)

(73) Assignee: Movix (UK) Limited, Wales (GB)

( * ) Notice: Subject to any disclaimer, the term of this patent is extended or adjusted under 35 U.S.C. 154(b) by 438 days.

(21) Appl. No.: 12/832,370

(22) Filed: Jul. 8, 2010

(65) Prior Publication Data

US 2011/0010464 A1    Jan. 13, 2011

(51) Int. Cl.
*G06F 15/16* (2006.01)
*G06F 15/173* (2006.01)

(52) U.S. Cl.
USPC .......................... 709/217; 709/224; 709/226

(58) Field of Classification Search
USPC .......................................... 709/217, 224, 226
See application file for complete search history.

(56) References Cited

U.S. PATENT DOCUMENTS

| | | | |
|---|---|---|---|
| 5,889,951 A | 3/1999 | Lombardi | |
| 7,143,130 B2 * | 11/2006 | Lin | 709/203 |
| 7,777,648 B2 * | 8/2010 | Smith et al. | 340/995.1 |
| 8,121,350 B2 * | 2/2012 | Klefenz | 382/104 |
| 8,150,941 B2 * | 4/2012 | Edecker et al. | 709/217 |
| 2001/0032236 A1 * | 10/2001 | Lin | 709/203 |
| 2002/0103781 A1 * | 8/2002 | Mori et al. | 707/1 |
| 2002/0188678 A1 * | 12/2002 | Edecker et al. | 709/204 |
| 2003/0033402 A1 * | 2/2003 | Battat et al. | 709/224 |
| 2003/0144894 A1 * | 7/2003 | Robertson et al. | 705/8 |
| 2005/0223176 A1 | 10/2005 | Peters, II | |
| 2006/0109267 A1 | 5/2006 | Rybacki et al. | |
| 2006/0238379 A1 * | 10/2006 | Kimchi et al. | 340/995.1 |
| 2006/0238380 A1 * | 10/2006 | Kimchi et al. | 340/995.1 |
| 2006/0238382 A1 * | 10/2006 | Kimchi et al. | 340/995.1 |
| 2007/0061363 A1 * | 3/2007 | Ramer et al. | 707/104.1 |
| 2007/0109299 A1 | 5/2007 | Peterson | |
| 2007/0273558 A1 * | 11/2007 | Smith et al. | 340/995.1 |
| 2007/0287474 A1 * | 12/2007 | Jenkins et al. | 455/456.2 |
| 2008/0318678 A1 * | 12/2008 | Stivoric et al. | 463/36 |
| 2009/0014515 A1 * | 1/2009 | Silverbrook et al. | 235/380 |
| 2009/0045250 A1 * | 2/2009 | Silverbrook et al. | 235/375 |

(Continued)

FOREIGN PATENT DOCUMENTS

| | | |
|---|---|---|
| EP | 0753836 | 1/1997 |
| JP | 10-40296 | 2/1989 |

(Continued)

*Primary Examiner* — Karen Tang
(74) *Attorney, Agent, or Firm* — McDonnell Boehnen Hulbert & Berghoff LLP

(57) ABSTRACT

A data processing system (1,2) stores coordinate data defining a plurality of unique regions (17), for example defined by a cell of a geodesic grid (13) applied to the surface of the earth (12). Each region can be allocated to an owner and there is stored a unique identifier for that region, a hierarchical descriptor for that region, data identifying the owner, and a network address which identifies an owner domain in respect of that region. An owner of a region may sub-allocate sub-regions (18) or objects of an allocated region and there is stored in respect of any sub-region or object that has been sub-allocated by an owner, an identifier and a hierarchical descriptor for that sub-region or object. The data processing system can resolve a descriptor based DNS query specifying a region, or a sub-region, or object of such a region, so as to return data comprising the network address for the owner domain allocated to that region.

22 Claims, 6 Drawing Sheets

(56) References Cited

U.S. PATENT DOCUMENTS

| | | | |
|---|---|---|---|
| 2009/0073191 A1* | 3/2009 | Smith et al. | 345/629 |
| 2010/0118025 A1* | 5/2010 | Smith et al. | 345/418 |
| 2010/0145602 A1* | 6/2010 | Morris | 701/200 |
| 2010/0246468 A1* | 9/2010 | Santhanam et al. | 370/312 |
| 2010/0248742 A1* | 9/2010 | Song et al. | 455/456.1 |
| 2011/0106614 A1* | 5/2011 | Ramer et al. | 705/14.46 |
| 2011/0212717 A1* | 9/2011 | Rhoads et al. | 455/420 |
| 2012/0005353 A1* | 1/2012 | Edecker et al. | 709/227 |
| 2012/0238255 A1* | 9/2012 | Ramer et al. | 455/414.2 |

FOREIGN PATENT DOCUMENTS

| | | |
|---|---|---|
| JP | 2000322600 | 11/2000 |
| WO | WO02/096041 | 11/2002 |
| WO | WO2005/091198 | 9/2005 |
| WO | WO2009/000028 | 12/2008 |

* cited by examiner

DATA PROCESSING SYSTEM USING GEOGRAPHICAL LOCATIONS

FIELD OF THE INVENTION

This invention relates to a data processing system which can resolve DNS queries using geographical locations.

BACKGROUND TO THE INVENTION

Current Internet protocols provide IP addresses and Uniform Resource Locators to identify data processing machines, domains and web pages, for example. The Domain Name Service allows more easily understood names to be used to locate specific sites or pages, as opposed to 32 bit (IPv4) or 128 bit (IPv6) addresses. The present invention concerns a system which uses similar technology to identify geographical locations and to allow easy access to content associated with such locations.

SUMMARY OF THE INVENTION

Viewed from one aspect, the invention provides a data processing system comprising data storage which stores coordinate data defining a plurality of unique geographical regions, each region being a cell of a geodesic grid applied to the surface of the earth;
wherein each region can be allocated to an owner and the data storage is configured to store, in respect of an allocated region, a unique identifier for that region and a hierarchical descriptor for that region, data identifying the owner, and a network address which identifies an owner domain in respect of that region;
the data processing system permits sub-allocation by an owner of an allocated region of at least one of: (i) a sub-region of the allocated region; (ii) an object within the allocated region; (ii) a sub-object of an object within the allocated region; (iv) an object within a sub-region of the allocated region; and (v) a sub-object of an object within a sub-region of the allocated region;
the data processing system is configured to store in the data storage, in respect of any sub-allocated sub-region, object or sub-object, an identifier and a hierarchical descriptor for that sub-region, object or sub-object;
and wherein the data processing system is configured to resolve a descriptor based DNS query specifying a region, so as to return data comprising the network address for the owner domain allocated to that region.

In some embodiments the data processing system is configured to resolve a descriptor based DNS query specifying a sub-region, object or sub-object of a region, so as to return data comprising the network address for the owner domain allocated to that region.

In some embodiments, the data processing system is configured to store in the data storage, in respect of any sub-allocated sub-region, object or sub-object, a network address which identifies a sub-owner domain in respect of that sub-allocated sub-region, object or sub-object, the data processing system being further configured to resolve a descriptor based DNS query specifying a sub-region, object or sub-object of a region, so as to return data comprising the network address for the sub-owner domain allocated thereto.

In some embodiments, each region, sub-region, object or sub-object is associated with a unique descriptive, location based, uniform resource locator.

Viewed from another aspect the present invention provides a data processing system comprising data storage means which stores coordinate data defining a plurality of unique geographical regions, each region being a cell of a geodesic grid applied to the surface of the earth;
wherein each region can be allocated to an owner and the data storage means is configured to store, in respect of an allocated region, a unique identifier for that region and a hierarchical descriptor for that region, data identifying the owner, and a network address which identifies an owner domain in respect of that region;
wherein sub-regions of an allocated region, and objects and sub-objects within an allocated region or within a sub-region of an allocated region, may be sub-allocated by an owner of that allocated region, and the data storage means is configured to store, in respect of any sub-region, object or sub-object that has been sub-allocated by an owner, an identifier and a hierarchical descriptor for that sub-region, object or sub-object;
and wherein the arrangement is such that the data processing system can resolve a descriptor based DNS query specifying a region, or a sub-region, object or sub-object of such a region, so as to return data comprising the network address for the owner domain allocated to that region.

Viewed from another aspect, the invention provides a method of processing data using a data processing system which comprises data storage means, the method comprising:
storing in the data storage means data defining a plurality of unique regions of a space;
allocating a region to an owner and storing in the data storage means, a unique identifier for that region and a hierarchical descriptor for that region, data identifying the owner, and a network address which identifies an owner domain in respect of that region;
in the event that sub-region of an allocated region, or an object or sub-object within an allocated region or within a sub-region of an allocated region, is sub-allocated by an owner of that allocated region, storing in the data storage means in respect of any such sub-region, object or sub-object that has been sub-allocated by an owner, an identifier and a hierarchical descriptor for that sub-region, object or sub-object;
receiving a descriptor based DNS query specifying a region, or a sub-region, object or sub-object of such a region, and using the data processing means to resolve the query and to return data comprising the network address for the owner domain allocated to that region.

Viewed from another aspect, the invention provides a computer program product comprising instructions which when executed on data process apparatus comprising data storage will cause the data processing apparatus to carry out a method comprising the steps of:
storing in the data storage, data defining a plurality of unique regions of a space;
allocating a region to an owner and storing in the data storage, a unique identifier for that region and a hierarchical descriptor for that region, data identifying the owner, and a network address which identifies an owner domain in respect of that region;
in the event that sub-region of an allocated region, or an object or sub-object within an allocated region or within a sub-region of an allocated region, is sub-allocated by an owner of that allocated region, storing in the data storage, in respect of any such sub-region, object or sub-object that has been sub-allocated by an owner, an identifier and a hierarchical descriptor for that sub-region, object or sub-object;
receiving a descriptor based DNS query specifying a region, or a sub-region, object or sub-object of such a region, and resolving the query to return data comprising the network address for the owner domain allocated to that region.

Viewed from another aspect of the invention there is provided a method comprising the steps of establishing, in data processing apparatus, a grid defining a plurality of regions of a space, storing coordinate data for regions and sub-regions, allocating ownership of a region to a party, storing domain data in respect of a domain specified by that party as associated with the allocated region, receiving a DNS query specifying a region or a sub-region, and resolving the query to return the domain data in respect of the domain specified by the party.

BRIEF DESCRIPTION OF THE DRAWINGS

Some embodiments of the invention will now be described by way of example, and with reference to the accompanying drawings, in which.

DETAILED DESCRIPTION OF THE PREFERRED EMBODIMENTS

Figure 1:
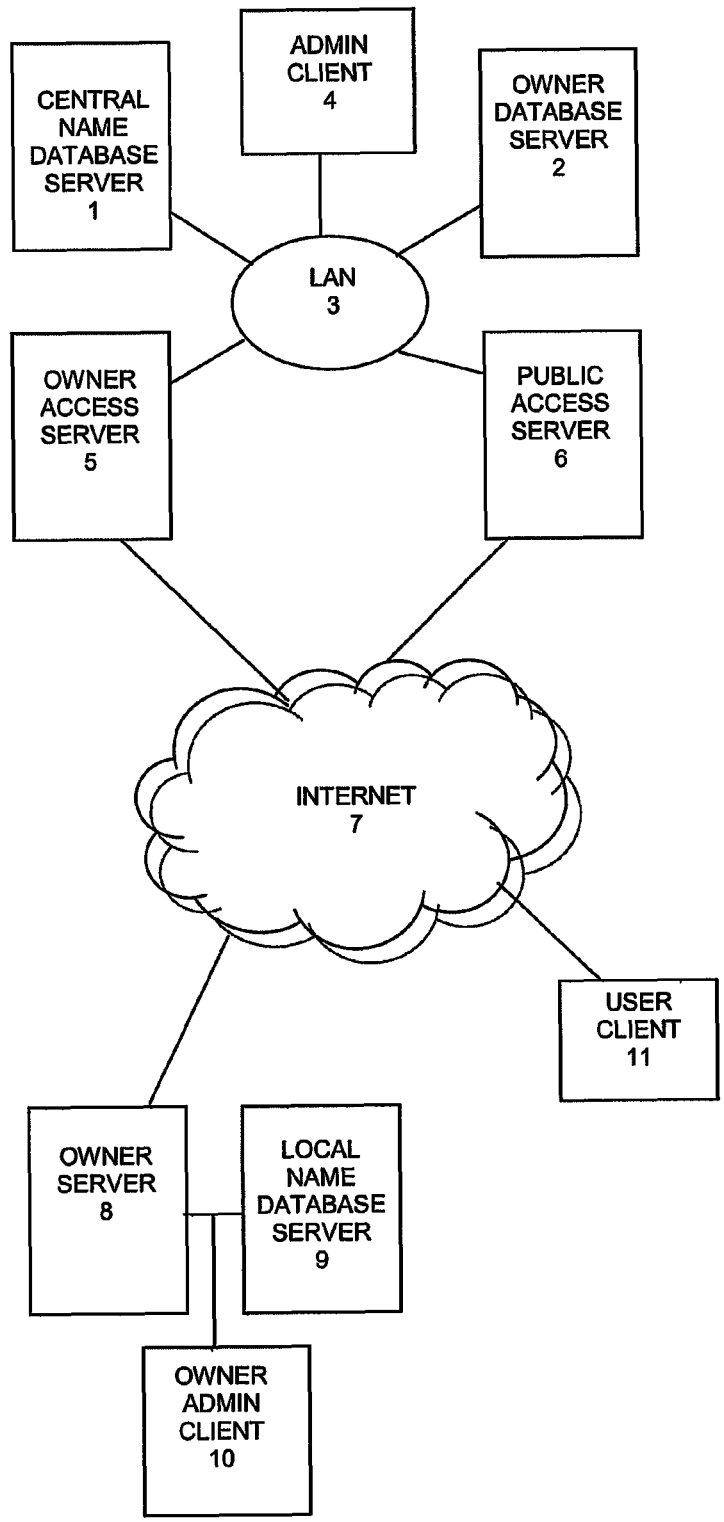
FIG. 1 is a schematic view of a data processing system in accordance with the invention.

In some preferred embodiments, there is provided a method of processing data using a data processing system which comprises data storage means, the method comprising: storing in the data storage means coordinate data defining a plurality of unique geographical regions, each region being a cell of a geodesic grid applied to the surface of the earth; allocating a region to an owner and storing in the data storage means, a unique identifier for that region and a hierarchical descriptor for that region, data identifying the owner, and a network address which identifies an owner domain in respect of that region; in the event that sub-region of an allocated region, or an object or sub-object within an allocated region or within a sub-region of an allocated region, is sub-allocated by an owner of that allocated region, storing in the data storage means in respect of any such sub-region, object or sub-object that has been sub-allocated by an owner, an identifier and a hierarchical descriptor for that sub-region, object or sub-object; receiving a descriptor based DNS query specifying a region, or a sub-region, object or sub-object of such a region, and using the data processing means to resolve the query and to return data comprising the network address for the owner domain allocated to that region.

The coordinate data may be in any convenient form, for example using decimal coordinates as in a Global Positioning System (GPS) such as 51.500795-0.142264, or conventional latitude and longitude coordinates such as 51° 30' 2.8614", 0° 8' 32.1504" (both sets defining the location of Buckingham Palace, London). For a triangular geodesic cell there would be, for example, three sets of coordinates defining three points of the triangle. However, there could be other ways of defining the coordinates, for example by starting with one set of coordinates for one point, and defining the directions and distances to the other two points. In general an equilateral triangle will be used. Other shapes of cell may also be used, with different numbers of points (corners) for example hexagonal or rectangular, if they can be fitted reasonably into a geodesic grid.

The regions need not be all of the same shape or size. For example, in a large expanse of sea a region may be larger than in a city. In the case of triangular cells, for example, there could be a single cell defining a region in an area of dense population and a plurality of cells, such as three or more, defining a region in an area such as the sea.

The unique identifier for a region could be the coordinate data or a value derived from the coordinate data. It could be an ID generated in another way, such as automatically as regions are identified or allocated. It a typical implementation of the invention there will be a table of region identifiers with their associated coordinate data There will also be an associated hierarchical descriptor for a region. For example, a triangular geodesic cell in respect of an area of London—perhaps with an area of approximately 1 square kilometre—would be defined by coordinates and would have a unique identifier such as an ID of integer form. Such an identifier does not explain to a user where a region may be. The hierarchical descriptor provides means for identifying the region in a more understandable way. For example, the introductory part of descriptor for a region in London could be:

europe/england/london, using a simple hierarchy of continent, country, and region such as a city or county. Then the descriptor will define the region more specifically, perhaps using a common name for the general area, or a major landmark in the area. For example, a cell which includes the Houses of Parliament and Westminster Abbey might be called "Westminster". Such a designation for a region will not be a perfect fit—because in normal usage by the public areas are not defined with reference to a geodesic cell. A region designated as "Westminster" would not match the boundaries of the "City of Westminster".

The choice of the final part of the descriptor for a region can be the responsibility of a person to whom the region is allocated. It should meet certain criteria, such as the whole descriptor being exclusive, but the final part of the descriptor does not have to be exclusive itself. For example, there could be two different cities with a region called "Chinatown"—one in "europe/england/london" and one in "united states/california/losangeles". The descriptor does not have to include full words and thus the descriptor last mentioned could be "usa/ca/la". In some preferred embodiments of the invention, the hierarchical descriptor leading to the region will be determined by the provider of the system, and the descriptor for the region itself can be chosen by the allocated owner of that region.

The owner allocated to a region will normally host content relating to the region. That domain will have a network address and that is also stored by the system. In practice, there may be stored further address details, designating a sub-address, web page and so forth where the information is located.

Within an allocated region, an owner can sub-allocate regions and objects. A sub-region can be any part of the region that the owner wishes to designate and is not restricted to, for example, a sub-cell of a geodesic grid. A sub-region could be a post code or zip code, road, area and so forth. In the case of a region "Westminster" in London, there could be sub regions of "Parliament Square", "Downing Street" and so forth. Within the region or a sub-region there could be designated objects and sub-objects, such as buildings, other structures or landmarks. Examples could be "Westminster Abbey", "Westminster Bridge", "10 Downing Street", "Houses of Parliament" and so forth. Sub-objects for "Houses of Parliament" could be, for example, "House of Commons" and "House of Lords". Thus, the full hierarchical descriptor for the "House of Lords" could be:
europe/england/london/westminster/parliament square/houses of parliament/house of lords".

When the owner of the region "Westminster" sub-allocates "Parliament Square" or "the House of Lords", the system operator is advised and records the transaction and details concerning the sub-allocated sub-region, object or sub-object. A person to whom a sub-region has been allocated may be designated as a sub-owner, with responsibility for the sub-allocation of further sub-regions, objects and sub-objects within that sub-region. The data processing system may store data concerning such a sub-owner.

The data processing system serves to resolve descriptor based DNS queries, using a dedicated naming system This gives rise to a new URL protocol, for example ddd://. Accordingly, a link to the House of Lords could be in the form: ddd://ddd.europe.london.westminster/parliamentsquare/houses_of_parliament/house_of_lords.

This link could, for example, be used on web pages in respect of Westminster so as to re-direct a reader to information specifically concerning the House of Lords. Alternatively there could a be a search service, in which users could input search terms and the possible results would be returned, for the user to select from. For example, a search for "Chinatown" could return two results—one for London and one for Los Angeles.

Such a link would be submitted to the data processing system in accordance with the invention, which would return the appropriate network address.

In preferred embodiments, the content in respect of regions is the responsibility of the owners (and sub-owners) to whom the regions, sub-region, objects and sub-objects have been allocated. However, there may be conditions imposed by the operator of the system. to ensure that the content is within guidelines concerning content type, decency, quality and so forth. In some embodiments, the operators of the system could provide a filter system at the name resolution level, allowing content creators to prevent particular visitors seeing, or not seeing, particular content by means of flagging, marking or otherwise noting particular database entries which are deemed appropriate or inappropriate to certain viewers.

As an alternative to the owner of a region being responsible for linking to the domains associated with sub-allocated sub-regions, objects or sub-objects, in some embodiments, the data processing system is configured to store in the data storage, in respect of any sub-allocated sub-region, object or sub-object, a network address which identifies a sub-owner domain in respect of that sub-allocated sub-region, object or sub-object, the data processing system being further configured to resolve a descriptor based DNS query specifying a sub-region, object or sub-object of a region, so as to return data comprising the network address for the sub-owner domain allocated thereto.

The data processing system could be provided by a single data processing machine, such as a server. However, in preferred embodiments the data processing system comprises a plurality of data processing machines. The data processing machines may be at a single location or may be distributed over a plurality of locations.

These data processing machines need not necessarily be owned by the operators of the system, but the system connects these remote machines to the central database.

A cell within a geodesic grid is essentially two dimensional, consisting of part of a surface—although that surface is curved. By the use of sub-regions, objects and sub-objects, it is possible to introduce a three dimensional character. For example, a floor of a building and an office on that floor could be designated:
europe/england/oxford/staldates/59/floor3/dehns Whilst some embodiments of the invention concern the earth, the principles can be applied to other objects of similar form such as the moon, other planets, the sun or other stars. Thus, in accordance with some embodiments of the invention there is provided a data processing system as set out above, but instead of a region being a cell of a geodesic grid applied to the surface of the earth, a region is a cell of a geodesic grid applied to the surface of a spherical or spheroidal body. In some embodiments, the principles invention are applied to other types of region, such as regions of space. In such a case, a region could be a portion of the surface of a sphere around the earth. A region could be defined by reference to a particular structure, such as a galaxy. In general terms the invention is applicable to virtual environments as well as to real environments such as the earth. It is not necessary for there to be geodesic grid, for example, provided there is a way of identifying a region uniquely, for example using coordinates or in the case of a virtual environment using a unique identifier for a object which is the region.

Thus, in accordance with some embodiments of the inventions there is provided a data processing system comprising data storage means which stores data defining a plurality of unique regions of a space; wherein each region can be allocated to an owner and the data storage means is configured to store, in respect of an allocated region, a unique identifier for that region and a hierarchical descriptor for that region, data identifying the owner, and a network address which identifies an owner domain in respect of that region; wherein sub-regions of an allocated region, and objects and sub-objects within an allocated region or within a sub-region of an allocated region, may be sub-allocated by an owner of that allocated region, and the data storage means is configured to store, in respect of any sub-region, object or sub-object that has been sub-allocated by an owner, an identifier and a hierarchical descriptor for that sub-region, object or sub-object; and wherein the arrangement is such that the data processing system can resolve a descriptor based DNS query in respect of a region, or a sub-region, object or sub-object of such a region, so as to return data comprising the network address for the owner domain allocated to that region.

Embodiments of the invention may be put into effect by a computer program comprising instructions which when carried out by data processing apparatus will cause the data processing apparatus to be configured to operate as described above, or to carry out a method as described above. The computer program could be provided on a data storage device such a CD. DVD, solid state memory module or the like, or may be provided from a remote location as a download over a suitable communications link such as a WAN. LAN or the Internet.

In accordance with various embodiments of the invention, a hierarchical descriptor for a region is stored by the data processing means. For a given region, this may be done in various ways but in general it is preferred that the individual record for a region does not contain the full descriptor data such as "europe.london.westminster". For example a database may store geographical data in a hierarchical manner, with associated ID's—for example the top level could be continents, then countries and so forth. The record for a particular region could then contain the ID's for the higher levels that it is in. The descriptor for that particular region (such as "Westminster") could be stored in the data for that region. Alternatively, it could be stored on the main geographical database, and an ID for the region stored on the record.

In some embodiments of the invention, a region or sub-region can be linked to an external location. Thus, a registered triangle or subdivided triangle may be used as a type of geo-link to an external internet based resource. For example, in some possible scenarios a company may purchase a triangle and use the triangle as a link to their word wide web based corporate website; or a rock band may purchase a subdivision of a triangle, such as the area of a stadium and link it to their Myspace™/Facebook™/YouTube™ pages or other internet resource; or a photographer may purchase a triangle or subdivided area of a national park and link it to a photography portfolio on an image hosting service.

The purchased regions or sub-regions can be keyword tagged. Thus, when visiting one of the above scenarios, the user is re-directed to the chosen internet resource, thus creating a type of geo-location based hyperlink and locational/regional keyword searching tool.

In some embodiments the platform in accordance with the invention can display different layers or "worlds" allowing different types of user interaction or viewing. By switching the main database from the standard database to one focussed on, for example, gaming, commerce or information accessibility, a variety of other possible worlds become available. The platform can combine alternate databases to display layers or parallel worlds in addition to, or as an alternative to, the main database. For example:

A news and current affairs database may allow real-time reporting or illustration of global, national or localised event containing data relevant to the news local.

A secure military database may allow real time combat analysis or strategic planning to be displayed.

A free access database may provide open access to public information or academic research.

A database of statistics may be overlaid to display population, land value, or other scientific data.

A satellite navigation database of roads, locations, landmarks and buildings may be overlaid over the main database or other database.

A "visually impaired" layer may be used to provide clearer, simplified visual feedback as well as extended functionality for visually impaired users, such as audio or haptic feedback.

Users can choose to enter into any available "parallel world/database" or toggle on/off any layers they wish or do not wish to see. Layers and parallel databases can be filtered according to user preference.

Referring now in detail to the drawings, in FIG. 1 there is shown a data processing system configured to implement the present invention. The servers and clients in the system may be specific of general purpose computers, running an operating system and application programs. Each will typically include a central processing unit including a processor, random access memory, read only memory, a non volatile bulk storage device such as a hard drive, an output device such as a monitor, and one or more input devices such as a keyboard and mouse. The clients and servers may have network interfaces. Each server indicated in FIG. 1 may consist of one or more physical machines and/or virtual machines, which may be in the same location or distributed over a plurality of locations.

An operator of the system has a central name database server 1 and an owner database serve 2, which communicate over a local area network, LAN 3. There is and administration client 4 also connected to the LAN 3, for administration of the system by an administrator. There are also an owner access server 5, for use by owners who have been allocated regions and a public access server for use by the general public, for example in a name lookup operation, also connected to the LAN 3. These access servers 5 and 6 are also connected to the Internet 7. An owner to whom a region has been allocated has an owner server 8 connected to the Internet 7, a local name database server 9 connected to the owner server, and an owner admin client 10 connected to both servers. A user client 10 is connected to the Internet 7, and may communicate with the public access server 6 and the owner server 8. URI (uniform resource identifier) requests for server addresses for particular regions are sent from the user client 10 to the public access server and requests resolved so that the server address is returned. URN (uniform resource name) requests in respect of particular objects within a region are sent by the user client 11 to the owner server 8.

Figure 2:
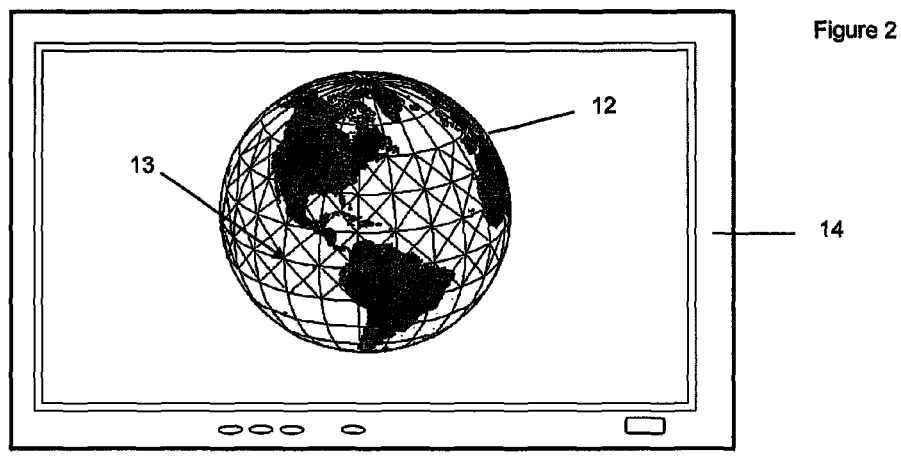
FIG. 2 is a view of a computer monitor on which is displayed a picture of the earth, with a geodesic grid superimposed.
Figure 3:
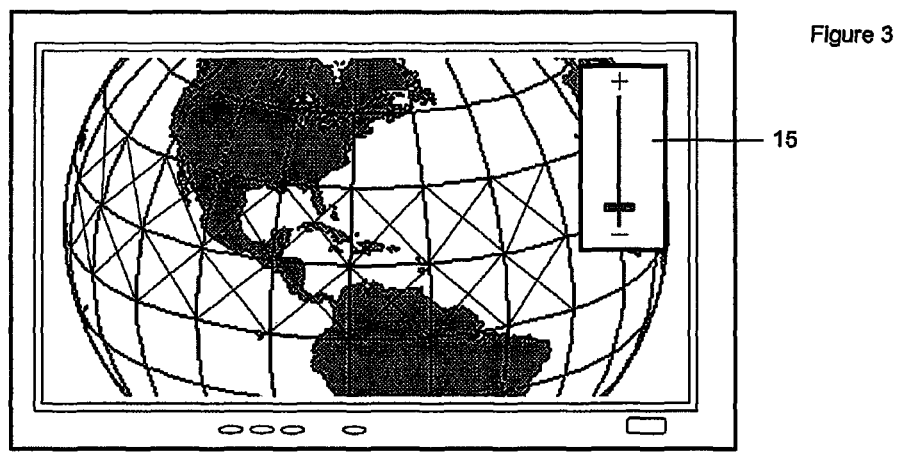
FIG. 3 is a view of a computer monitor on which is displayed a picture of the earth, with the geodesic grid superimposed, at higher magnification than in FIG. 2.
Figure 4:
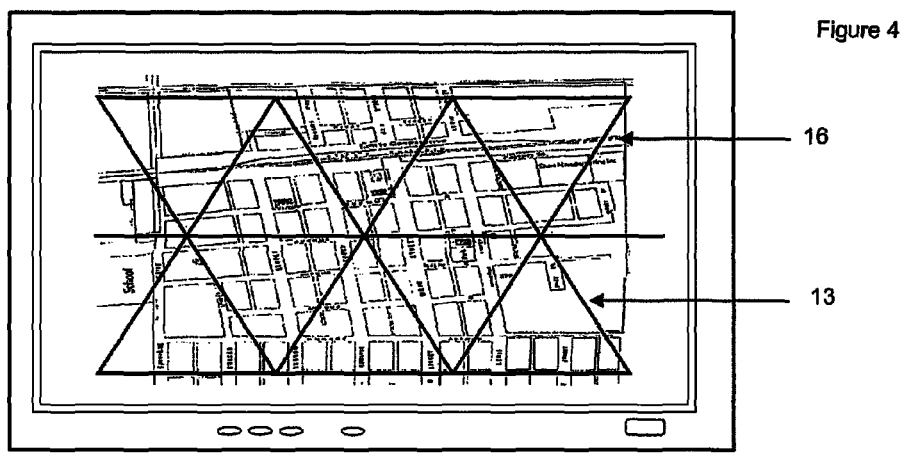
FIG. 4 is a view of a computer monitor on which is displayed amore specific geographical region, with cells of a geodesic grid superimposed.

FIG. 2 shows how an image of the earth 12 is divided into regions by a geodesic grid 13, the image being displayed on a computer monitor 14. FIG. 3 shows an enlarged view, with the level of zoom being adjusted by a zoom control 15. FIG. 4 shows a zoomed-in view, looking at a region 16 of a city with triangular cells of the geodesic grid 13 superimposed. A particular cell, such as cell 17 shown highlighted in FIG. 5, and in single cell view in FIG. 6, will be identified by means of the coordinates of the three coordinates of the triangle. This data is stored in the central name database. Also stored in the central name database is a "user-friendly" descriptive identifier for the region designated by the cell, using a hierarchical system. Thus, for example, if the city is New York in the state of New York, United States of America, and if the principal road in this cell is East Street, then the full hierarchical descriptor for the cell may be: usa.ny.ny/eastst. In addition to this full hierarchical descriptor, using abbreviations, there may also be provided a label using more colloquial language and omitting the full hierarchy, such as "East Street, New York", as shown by way of example on FIGS. 5 and 6.

Figure 6:
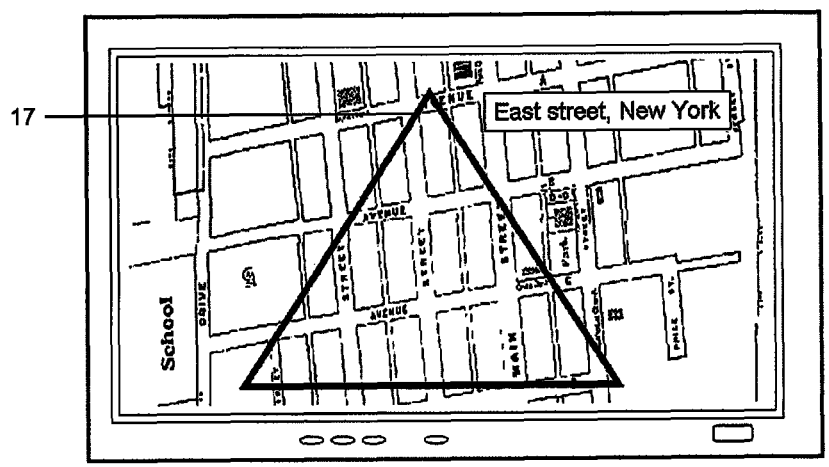
FIG. 6 is a view showing the selected cell at greater magnification.

In this example the main cell 17 shown in FIG. 6 has been allocated to an owner, who was responsible for choosing the name "East Street" in respect of this cell. The owner database stores information about ownership of the cell, and the chosen name is stored in the central name database.

Figure 5:
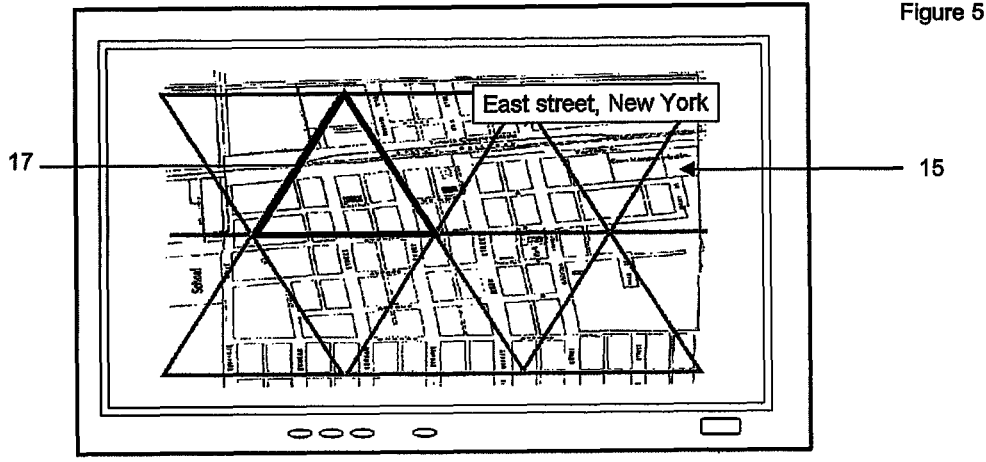
FIG. 5 is a view similar to FIG. 4, showing a particular cell selected.

In this embodiment, the user of the user client 11 can view a model of the earth, rotate and zoom to identify a general region, and then by clicking on appropriate portions of the screen, drill down to a particular region. In such an arrangement, an application similar to Google Earth™ could be running on the user client. At a resolution where individual grid cells are visible, for example as shown in FIGS. 4 and 5, the cells can be identifiable my means of linking to the public access server 6 and the central name database server 1. The individual cells are "active, so that a user can click on a cell and obtain information about that cell, such as the name as shown in FIGS. 5 and 6.

Figure 7:
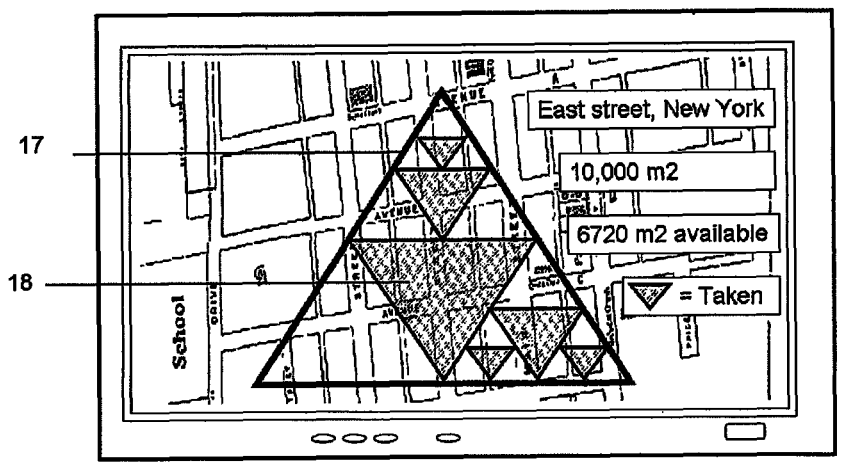
FIG. 7 is a view showing sub-regions within the cell that have been allocated.
Figure 8:
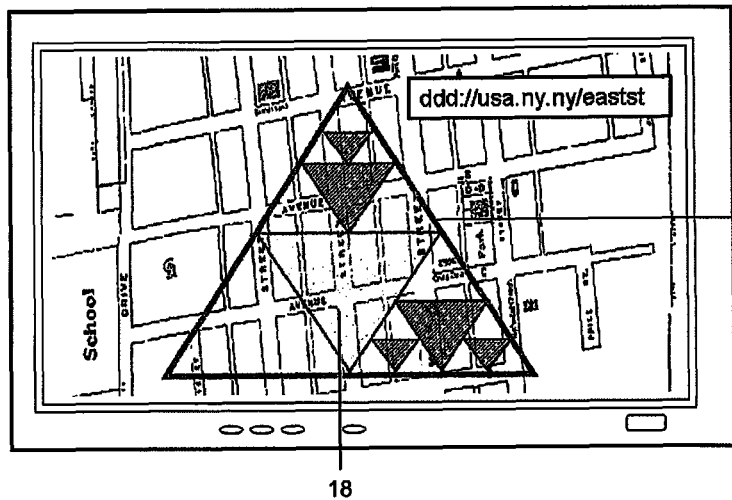
FIG. 8 is a view similar to FIG. 7, with the URL shown.

FIG. 7 shows how further information about a cell can be displayed, by selecting a suitable option. By way of example, the total area of the cell 17 is shown, in this case 10,000 m². The owner of the cell has also sub-allocated regions of the cell 17, as shown by sub-regions indicted at 18 by way of example. The display shows the sub-cells that have been allocated, and also shows the remaining area within cell 17 that is available for sub-allocation. FIG. 8 is similar to FIG. 7, but shows the URL of the cell 17.

Figure 9:
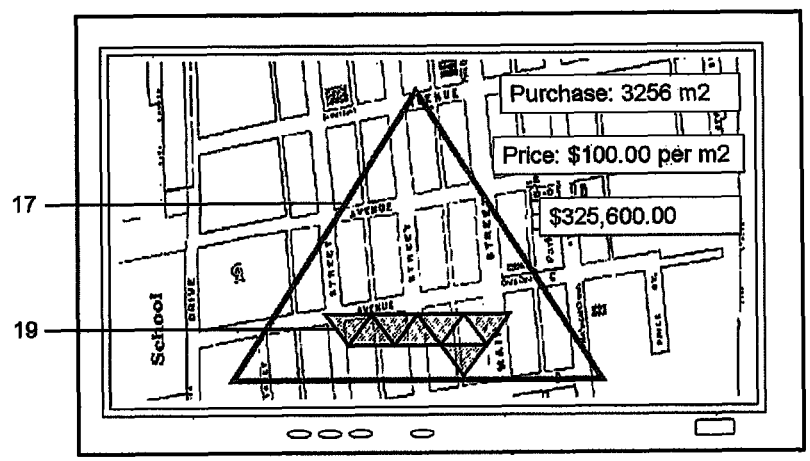
FIG. 9 is a view similar to FIG. 7, showing sub-regions selected for purchase.
Figure 10:
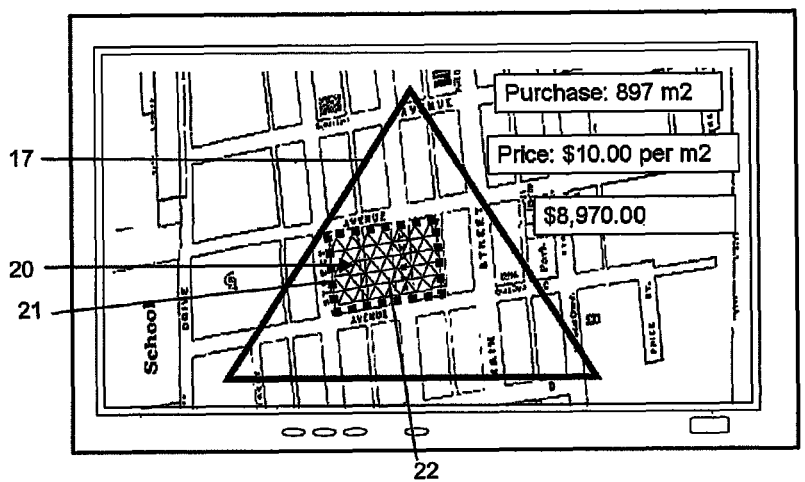
FIG. 10 is a view similar to FIG. 7, showing how sub-regions and objects can be selected.

If a user wishes to be sub-allocated one or more regions within cell 17, this can be done by scaling the grid to whatever scale is required, and then selecting one or more sub-cells. FIG. 9 shows how a number of sub-cells 19 have been selected. The display indicates the area of the selected region, the price that the owner is charging, and the total price for being allocated these sub-cells. It is not necessary to for a user to select grid cells, although in the preferred embodiment the grid is infinitely scalable and thus versatile. It is possible to designate objects within a cell, such as streets, buildings, and even individual offices within buildings. It is also possible to select a sub-region my means of drawing a path around a region, which may be regular (such as rectangular, another polygon, or circular) or irregular. For the purposes of consistency in terms of data storage, a region so marked may then be divided up into a suitable number of small sub-cells. A region 20 designated by a path 21 and then divided into triangular sub-cells 22 by the system is shown in FIG. 10.

Figure 11:
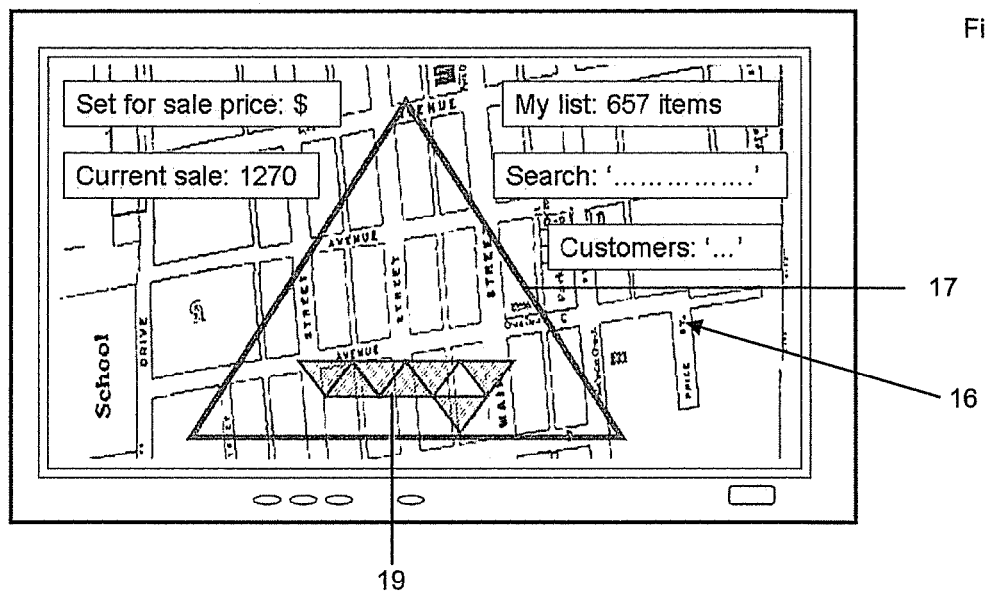
FIG. 11 shows how an owner can view details of, and administer, allocated regions and objects.

The owner of a main cell such as cell 17 uses a content management system to view information about the cell, record details about any transactions and so forth. Thus, for example, when a user has purchased a sub-region as shown in FIG. 9, the owner may view and/or input information on a screen such as that shown in FIG. 11.

The owner of a cell, or of a sub-region, object or sub-object within a cell ("property"), may link information to that property. For example, the "owner" of the Statue of Liberty in New York might be a commercial organisation which organises boat trips to visit the Statue of Liberty, or a non-commercial organisation which provides historical and other information about the Statue of Liberty.

In terms of a commercial transaction, the operator of the system may take a percentage of all transactions carried out by an owner of a cell, such as selling or leasing "property", i.e. the entire cell, or sub-regions, objects or sub-objects within the cell. Transactions may initiate payment of a commission to the operator of the system, and will generate a new entry in the central name database. In a preferred embodiment as described above, each basic equilateral triangular cell has an area of approximately 10,000 square metres, representing a triangle side of approximately 152 metres.

The system provides a calculator which allows an owner to assign any price for any size of area within a cell or group of cells. An area to be sub-allocated can be delineated by the use of a simple marquee tool or similar, allowing the selection of irregularly shaped areas. The area of a selected space may be calculated at a predefined price per square metre, and payment is made through an integrated e-commerce system, after which ownership of the area is assigned to the new user in the central owner database. In the course of this transaction, the operator may take a percentage based commission for registration of the transaction in the database.

The system could be operated using a mobile device such as a phone or portable digital assistant (PDA) enabled with a global positioning service. This could provide a proximity system, employing push notification, to provide a user with information on the availability of land areas for sale within the central database, which are within a certain, predefined distance from the users current location, and are within certain parameters set by the user. For example, a user may set the device to update on areas for sale within a 1 kilometre radius, under the price of $5.00 per square metre with at least a footprint area of 800 square metres. This provides an alternative to dealing with everything in a virtual environment. Instead of just looking at images on a screen, a user occupies a real space and looks then at nearby areas available.

What information the owner of a cell, sub-region, object or sub-object decides to link to the location concerned, is up to that owner. It could be promotional material linked to a service provided in the location, or linked to an object such as a statue or museum in the location, it could be purely informative material concerning the location, or it could be an advertisement which the provider of a service or product might be attractive to people interested in the location.

The system could use a publicly owned and locally hosted database. An interface for accessing the system may be capable of being navigated in a non-language based (i.e. purely visual) manner. A touch screen technology interface will facilitate simple operation on hand held devices such as PDA's or mobile phones.

For example on an iPhone™ type of device, a process could be:
1. Touch the screen over the country of your choice—(ddd.uk)
2. Open fingers over the town you are looking for—(ddd.uk.oxford)
3. Locate the rough grid area you are looking for—(ddd.uk.oxford.centre)
4. Touch one cell on the screen.

Searches for content can be exclusive and limited to the boundaries of the current cell The above example uses three touches and one or two open up actions. This is convenient, visual and non language based navigation.

A purchaser can use a simple way of selecting any number of cells in the grid in any shape they want—for example by using a marquee tool, rather than just bisections of triangles.

When a purchaser buys a cell, they can become an administrator of that cell (if they wish) and may be provided with content management software which provides various options for buying and selling other cells within the main cell, setting the prices for those cells, subdividing and joining cells, and so forth.

This software would be linked to the main database of the operator of the system and would immediately update the system should any changes be made, such as changes of ownership, pricing and calculation of any commission payable to the system operator for sales. The application can generate default but individual names for any newly generated subsets of cells within an area, or allow the owner to set names for these new cells. This software is preferably capable of running as an application on a portable hand-held device.

A cash transaction system for buying/selling cells could use a local currency converter, and allow the user to have various methods for quickly calculating the cost per square metre when selecting an area to purchase, or to set this price when selling cells. Subsequent purchasers of a group of cells can also use this calculator to set the price of cells—increasing or decreasing it as they wish. For example, Someone buys a 1 Km² triangular cell area of coastline at the standard price of $9.99. They then offer approximately half these cells (the sea) for sale at $5.00 per m², but the land for sale at $100.00 per m². A line can be drawn across the cell using the marquee tool following the coastline where it bisects the cell to separate the two price bands. The calculator quickly works out the number of cells in each price band, updates the central database with this information, and shows this area as available and at what price within the main application. The calculator can also allow for an owner to sell cells by auction of various types (private, open, sealed bid etc.) to set reserve prices and start and end dates for the auction.

In preferred embodiments of the invention, the main operator of the system does not host any of the content. Hosting is provided either by the users themselves or through 3$^{rd}$ party hosting companies.

In some embodiments of the invention, on purchasing a cell within the grid, an owner may receive the following:
1. Entry into the main database identifying them as the unique owner of the cell or cells.
2. Overall name for the primary cell, based on a 1 Km² or otherwise standard area.
3. The ability to create subsets of a cell of any number of polygonal cells.
4. The ability to sell and manage transaction of subsets of cells.
5. A content management application to control transactions, and to sub-divide and rename areas of cells.
6. An optional free virtual world environment software platform, although they should be able to use any platform they wish.
7. A default texture (image) relating to the actual real world area the cells represent. This can be used in the same manner as conventional websites use a "placeholder" image.

It will be appreciated that the precise commercial arrangements may vary and that in preferred embodiments of the invention the principal element is the architecture provided so that regions can be identified, allocated, and links provided to content using a URL system.

In some embodiments of the invention, the grid consists of a database of registration details indexed by a hierarchical geodesic subdivision of a sphere overlaid on to the Earth. One system utilises the GIS extensions of MySQL™ to store a geometric representation of the grid as a spatial index. The database is seeded with a set of triangles each approximately 0.9 km square. The system requires that the entire grid is generated and stored regardless of whether a triangle has data associated with it or not. This results in the vast majority of the data being redundant. This redundancy increases as the triangles are subdivided because each subdivision yields, for example, four new triangles and it is possible that only one of these will have data attached.

An alternative proposal is to replace the static storage of geometric data with a process which generates the data in response to search requests.

Figure 12:
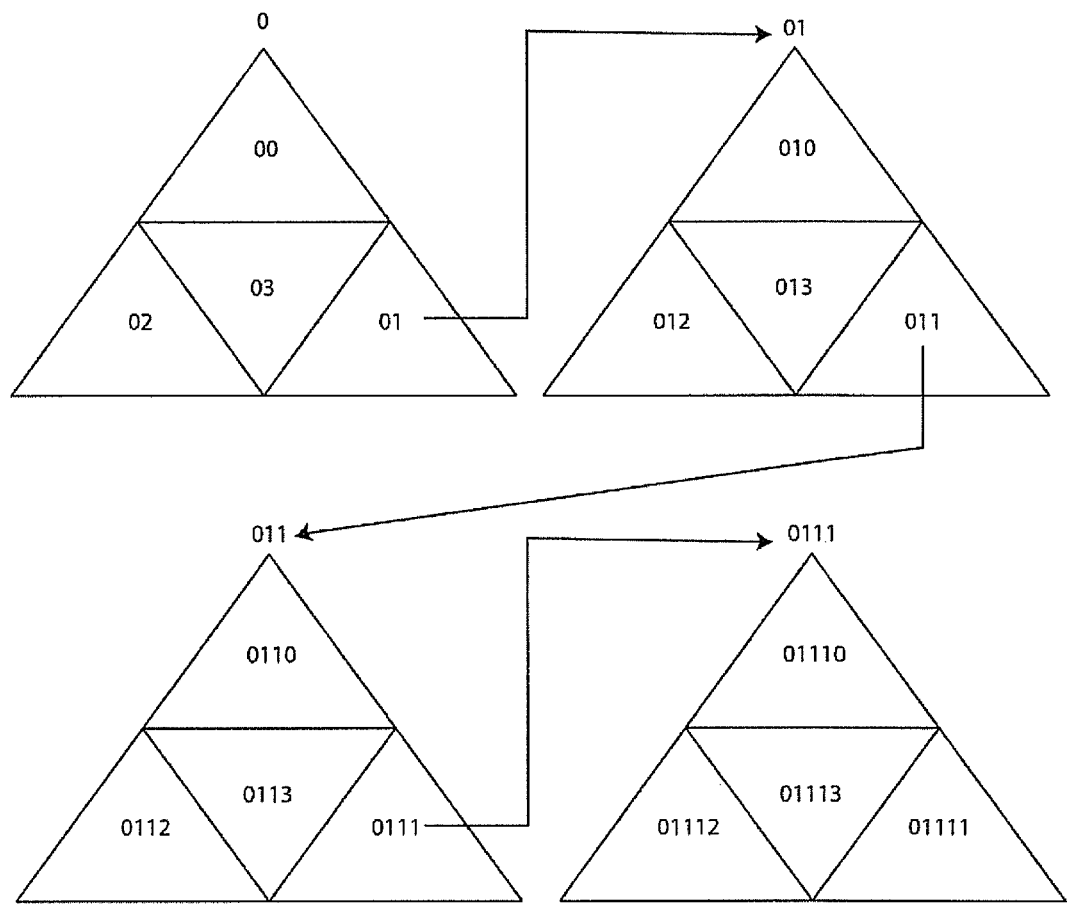
FIG. 12 is a diagram illustrating the parent/child relationship between triangles of a grid.

The preferred grid in some embodiments is created through repeated subdivision of a "seed" octahedron. The octahedron is initially divided into eight triangles. These may have unique identifiers 0, 1, 2, 3, 4, 5, 6 and 7. There can then be repeated subdivisions of each triangle into four new triangles, each of which has a unique index of 0, 1, 2 or 3. This index is appended to the parent id to form a unique identifier for that triangle. Thus, with reference to FIG. 12, there is shown firstly one triangle, id 0, of an octagon. This is subdivided into four triangles with id's 00, 01, 02 and 03. Triangle 01 can then be subdivided into a further four triangles 010, 011, 012 and 013. Triangle 011 can then be subdivided into triangles 0110, 0111, 0112 and 0113. Triangle 0111 can then be subdivided into triangles 01110, 01111, 01112 and 01113. The process can continue with subdivision into as small a set of four triangles as is desired.

This form of identifier generation implicitly links each triangle to its parent, since removing the final digit of the id of a triangle will yield the parent id. It will be appreciated that id of a base triangle in an octagon will also be preceded by a unique identifier for that octagon, which again can be provided in a hierarchical manner.

Since the subdivision process naturally yields a unique identifier for each triangle, this identifier is used to index the associated data. The result is a sparse data set with no redundancy.

Client Software Requests Triangles are generated in response to two primary requests from the client software. These are POINT and AREA.

POINT consists of a coordinate (expressed as latitude, longitude), and is generated a result of a user selection (click) within the grid. The results of a search initiated by this request are used to display or update the data associated with the selected triangle.

AREA consists of two coordinates (expressed as south west and north east) which represent a rectangle. This is generated when an area of the grid is exposed by panning or zooming by the user. The results of searches initiated by this request are used to render the grid in the client server response to the POINT Request.

The process starts with the seed octahedron as described above. The requested subdivision level can be numerically specified in the request or implied by a condition such as the first level with associated data. The next step is to find the triangle containing POINT. If the requested subdivision level is reached then the process returns to search using the triangle id. Otherwise, the process subdivides the current triangle and return to the AREA Request. The process then again starts with the seed octahedron, and the level of detail can be fixed or specified in the request. The process finds all triangles intersecting the AREA. If the requested level of detail is reached, then the process returns to triangles. Otherwise, for each triangle the process subdivides and return. Both of these methods allow for an infinitely variable resolution grid.

Thus, in some embodiments of the invention there is a provided a system in which regions and sub regions are defined using a grid of top level parent triangles each having a unique identifier, each top level parent triangle being repeatedly sub-divisible into four lower level triangles in a cascading parent/child relationship, wherein each lower level triangle has a unique identifier comprising the unique identifier of its parent triangle and an identifier to distinguish it from the other three children of that parent triangle. In a preferred arrangement of this type, the top level parent triangles are arranged in groups of eight forming an octagon, each top level parent triangle in an octagon having a unique identifier which comprises a unique identifier for the octagon and an identifier to distinguish it from the other seven triangles in that octagon. The octagons and the triangles may be part of a geodesic grid, for example one in respect of the surface of the earth.

The above described embodiments of the invention are by way of examples and are not limiting as to the scope of the invention as defined in the claims.

What is claimed is:
1. A data processing method carried out on a data processing system, the system comprising a processor and a data storage device which stores coordinate data defining a plurality of unique geographical regions, each region being a cell of a geodesic grid applied to the surface of the earth;

wherein each region can be allocated to an owner and the method comprises allocating regions to respective owners and in respect of each allocated region, using the data storage device is configured to store, in respect of that allocated region, a unique identifier for that region and a hierarchical descriptor for that region, data identifying the owner, and a network address which identifies an owner domain in respect of that region;

the method comprises sub-allocation by an owner of an allocated region of at least one of: (i) a sub-region of the allocated region; (ii) an object within the allocated region; (ii) a sub-object of an object within the allocated region; (iv) an object within a sub-region of the allocated region; and (v) a sub-object of an object within a sub-region of the allocated region;

wherein regions and sub regions are defined using a grid of top level parent triangles each having a unique identifier, each top level parent triangle being repeatedly sub-divisible into four lower level triangles in a cascading parent/child relationship, wherein each lower level triangle has a unique identifier comprising the unique identifier of its parent triangle and an identifier to distinguish it from the other three children of that parent triangle;

the method comprises storing in the data storage, in respect of any sub-allocated sub-region, object or sub-object, an identifier and a hierarchical descriptor for that sub-region, object or sub-object;

and wherein the method comprises resolving a descriptor based DNS query specifying a region, so as to return data comprising the network address for the owner domain allocated to that region.

2. A data processing method as claimed in claim 1, wherein the method comprises resolving a descriptor based DNS query specifying a sub-region, object or sub-object of a region, so as to return data comprising the network address for the owner domain allocated to that region.

3. A data processing method as claimed in claim 1 wherein the method comprises storing, in the data storage device, in respect of any sub-allocated sub-region, object or sub-object, a network address which identifies a sub-owner domain in respect of that sub-allocated sub-region, object or sub-object, the method further comprising resolving a descriptor based DNS query specifying a sub-region, object or sub-object of a region, so as to return data comprising the network address for the sub-owner domain allocated thereto.

4. A data processing method as claimed in claim 2, wherein each region, sub-region, object or sub-object is associated with a unique descriptive, location based, uniform resource locator.

5. A data processing method as claimed in claim 1, wherein the top level parent triangles are arranged in groups of eight forming an octagon, each top level parent triangle in an octagon having a unique identifier which comprises a unique identifier for the octagon and an identifier to distinguish it from the other seven triangles in that octagon.

6. A data processing method as claimed in claim 1, wherein the method comprises storing sub-ownership data in the event that an owner of an allocated region enters into a sub-ownership transaction in respect of a sub-allocated sub-region, object or sub-object within an allocated region.

7. A data processing method carried out on a data processing system, the system comprising a processor and a data storage device which stores data defining a plurality of unique regions of a space, each region being a cell of a geodesic grid applied to the surface of the earth;

wherein each region can be allocated to an owner and the method comprises allocating regions to respective owners and in respect of each allocated region, using the data storage device to store, in respect of each allocated region, a unique identifier for that region and a hierarchical descriptor for that region, data identifying the owner, and a network address which identifies an owner domain in respect of that region;

the method comprises sub-allocation by an owner of an allocated region of at least one of: (i) a sub-region of the allocated region; (ii) an object within the allocated region; (ii) a sub-object of an object within the allocated region; (iv) an object within a sub-region of the allocated region; and (v) a sub-object of an object within a sub-region of the allocated region;

wherein regions and sub regions are defined using a grid of top level parent triangles each having a unique identifier, each top level parent triangle being repeatedly sub-divisible into four lower level triangles in a cascading parent/child relationship, wherein each lower level triangle has a unique identifier comprising the unique identifier of its parent triangle and an identifier to distinguish it from the other three children of that parent triangle;

the method comprises storing in the data storage device, in respect of any sub-allocated sub-region, object or sub-object, an identifier and a hierarchical descriptor for that sub-region, object or sub-object;

and wherein the method comprises resolving a descriptor based DNS query specifying a region, so as to return data comprising the network address for the owner domain allocated to that region.

8. A data processing method as claimed in claim 7, wherein the method comprises resolving a descriptor based DNS query specifying a sub-region, object or sub-object of a region, so as to return data comprising the network address for the owner domain allocated to that region.

9. A data processing method as claimed in claim 7 wherein the method comprises storing, in the data storage device, in respect of any sub-allocated sub-region, object or sub-object, a network address which identifies a sub-owner domain in respect of that sub-allocated sub-region, object or sub-object, the method further comprising resolving a descriptor based DNS query specifying a sub-region, object or sub-object of a region, so as to return data comprising the network address for the sub-owner domain allocated thereto.

10. A data processing method as claimed in claim 8, wherein each region, sub-region, object or sub-object is associated with a unique descriptive, location based, uniform resource locator.

11. A data processing method as claimed in claim 7, wherein the data storage stores coordinate data defining the plurality of unique regions.

12. A data processing method as claimed in claim 7, wherein each region is a cell of a geodesic grid applied to the surface of the earth.

13. A data processing method as claimed in claim 7, wherein the space is a virtual environment.

14. A data processing method as claimed in claim 7, wherein the top level parent triangles are arranged in groups of eight forming an octagon, each top level parent triangle in an octagon having a unique identifier which comprises a unique identifier for the octagon and an identifier to distinguish it from the other seven triangles in that octagon.

15. A non-transitory computer program product comprising instructions which when carried out by a data processing apparatus comprising a data storage device and a processor, will cause the data processing apparatus to carry out a method comprising:

storing, in the data storage device, data defining a plurality of unique regions of a space, wherein each region is a cell of a geodesic grid applied to the surface of the earth;

allocating a region to an owner and storing, in the data storage device, a unique identifier for that region and a hierarchical descriptor for that region, data identifying the owner, and a network address which identifies an owner domain in respect of that region;

permitting sub-allocation by an owner of an allocated region of at least one of: (i) a sub-region of the allocated region; (ii) an object within the allocated region; (ii) a sub-object of an object within the allocated region; (iv) an object within a sub-region of the allocated region; and (v) a sub-object of an object within a sub-region of the allocated region; and storing, in the data storage device, in respect of any sub-allocated sub-region, object or sub-object, an identifier and a hierarchical descriptor for that sub-region, object or sub-object;

wherein regions and sub regions are defined using a grid of top level parent triangles each having a unique identifier, each top level parent triangle being repeatedly sub-divisible into four lower level triangles in a cascading parent/child relationship, wherein each lower level triangle has a unique identifier comprising the unique identifier of its parent triangle and an identifier to distinguish it from the other three children of that parent triangle;

and resolving a descriptor based DNS query specifying a region, so as to return data comprising the network address for the owner domain allocated to that region.

16. A non-transitory computer program product as claimed in claim 15, wherein the method comprises resolving a descriptor based DNS query specifying a sub-region, object or sub-object of a region, so as to return data comprising the network address for the owner domain allocated to that region.

17. A non-transitory computer program product as claimed in claim 15 wherein the method comprises storing in the data storage, in respect of any sub-allocated sub-region, object or sub-object, a network address which identifies a sub-owner domain in respect of that sub-allocated sub-region, object or sub-object, the method further comprising resolving a descriptor based DNS query specifying a sub-region, object or sub-object of a region, so as to return data comprising the network address for the sub-owner domain allocated thereto.

18. A non-transitory computer program product as claimed in claim 16, wherein each region, sub-region, object or sub-object is associated with a unique descriptive, location based, uniform resource locator.

19. A non-transitory computer program product as claimed in claim 15, wherein each region is a cell of a geodesic grid applied to the surface of the earth.

20. A non-transitory computer program product as claimed in claim 15, wherein the space is a virtual environment.

21. A non-transitory computer program product as claimed in claim 15 wherein the top level parent triangles are arranged in groups of eight forming an octagon, each top level parent triangle in an octagon having a unique identifier which comprises a unique identifier for the octagon and an identifier to distinguish it from the other seven triangles in that octagon.

22. A non-transitory computer program product as claimed in claim 15, wherein the data processing system stores sub-ownership data in the event that an owner of an allocated region enters into a sub-ownership transaction in respect of a sub-allocated sub-region, object or sub-object within an allocated region.

* * * * *